United States Patent
Modadugu et al.

(10) Patent No.: US 8,364,756 B1
(45) Date of Patent: Jan. 29, 2013

(54) CONNECTION SHARING

(75) Inventors: Nagendra Modadugu, San Francisco, CA (US); Darin Fisher, San Carlos, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/559,126

(22) Filed: Jul. 26, 2012

Related U.S. Application Data

(63) Continuation of application No. 12/702,214, filed on Feb. 8, 2010.

(51) Int. Cl.
*G06F 15/16* (2006.01)
(52) U.S. Cl. ........ 709/203; 709/219; 709/223; 709/224; 709/225; 709/226; 709/229
(58) Field of Classification Search .................. 709/203, 709/219, 223, 224, 225, 226, 229
See application file for complete search history.

(56) References Cited

U.S. PATENT DOCUMENTS

2008/0228931 A1* 9/2008 Pancholi et al. .............. 709/228

* cited by examiner

*Primary Examiner* — Firmin Backer
*Assistant Examiner* — Jonathan Bui
(74) *Attorney, Agent, or Firm* — Fish & Richardson P.C.

(57) ABSTRACT

A method, computer-readable medium, and system for re-using a connection between a client computing device and a server system. The method includes receiving at a server system a request from a client computing device to initiate a connection; receiving over the connection a request from the client computing device for first content from a first domain hosted by the server system; sending information to the client computing device over the connection that specifies one or more additional domains hosted by the server system and acceptable to the server system for connection sharing; receiving over the connection a request for second content from a second domain that is hosted by the server system and that was specified in the information sent from the server system to the client computing device; and sending the second content to the client computing device over the connection in response to receiving the request.

20 Claims, 7 Drawing Sheets

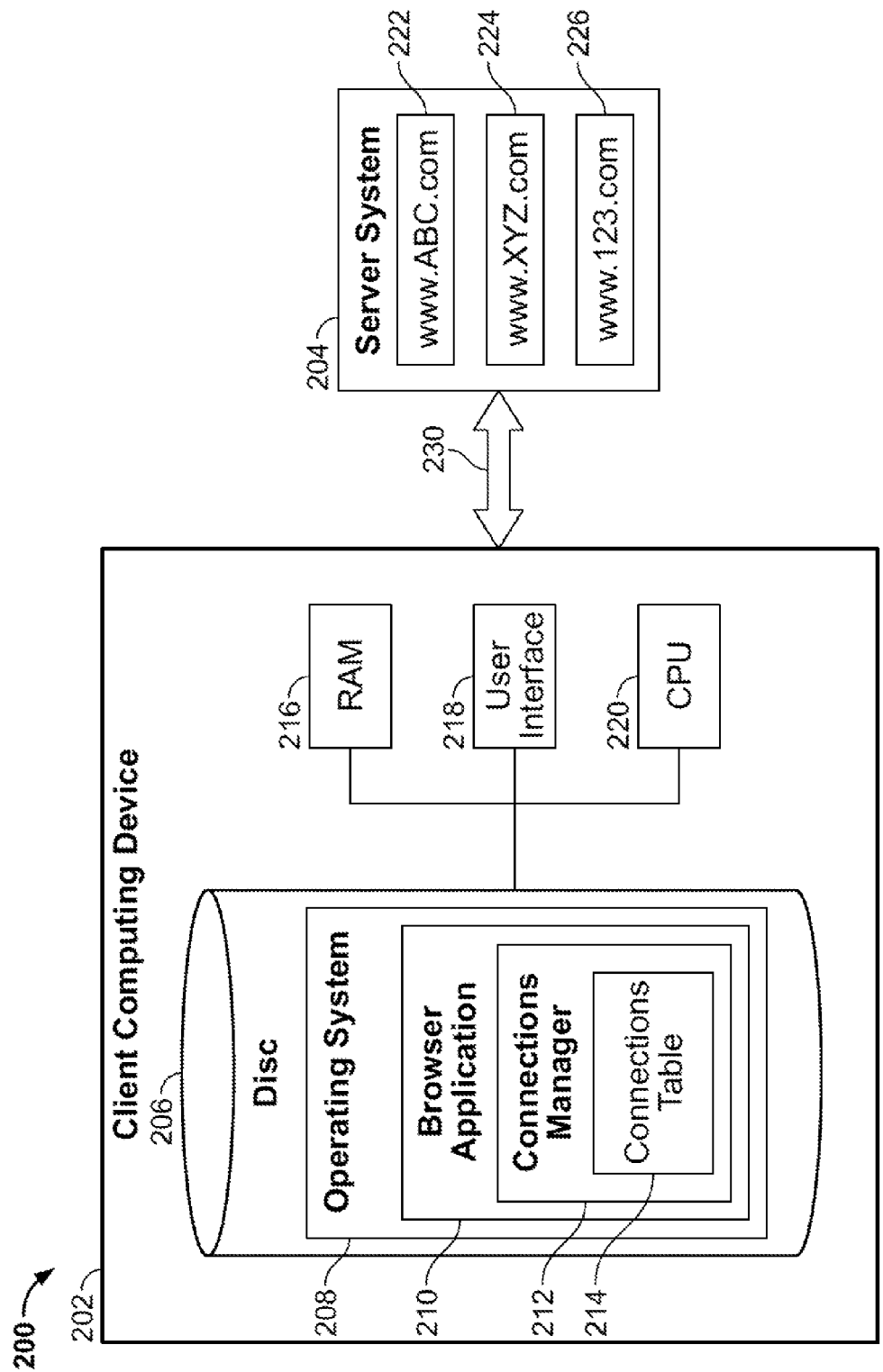

US 8,364,756 B1

CONNECTION SHARING

CROSS-REFERENCE TO RELATED APPLICATION

This application is a continuation application of and claims priority to U.S. application Ser. No. 12/702,214, filed on Feb. 8, 2010.

TECHNICAL FIELD

This document relates to reducing latency in network communications.

BACKGROUND

A significant portion of web browsing latency can be attributed to round-trip-time (RTT) between a client computing device and a server system. For example, each time the client computing device initiates a new connection with a server system there is at least one RTT incurred. If a domain name must be resolved to an Internet Protocol (IP) address before the connection can be initiated, then another RTT can be incurred to resolve the domain name. The more RTT incurred, the higher the latency time for a particular transaction between the client computing device and the server system, and the more negative an experience for an end-user of the client computing device.

SUMMARY

This specification describes technologies relating to re-using a connection between a client computing device and a server system. In general, one aspect, the subject matter described in this specification can be embodied in methods for providing for re-using a connection, which includes receiving at a client computing device a first domain name corresponding to a first domain and a request for first content from the first domain. An Internet Protocol (IP) address is determined for a server system that hosts the first domain. A connection is initiated between the client computing device and the server system and a request is sent to the server system for the first content. Information is received from the server system, in response to formation of the connection, which identifies one or more additional domains that are hosted by the server system and acceptable to the server system for connection sharing. A second domain name corresponding to a second domain and a request for second content from the second domain is received at the client computing device. That the second domain name corresponds to one of the one or more additional domains and that the second domain is acceptable to the server system for connection sharing is determined. That the connection previously formed and maintained between the client computing device and the server system is available is determined. Based on determining that the connection is available, a request is sent to the server system over the connection for the second content. Other embodiments of this aspect include corresponding systems, apparatus, and computer programs recorded on computer storage devices, each configured to perform the actions of the methods.

These and other embodiments can each optionally include one or more of the following features, alone or in combination. Determining that the server system hosts the second domain can include determining a second IP address for a server system that hosts the second domain and determining that the second IP address matches the IP address of the first domain. Determining the IP address and determining the second IP address can include making requests with the first and second domain names to a domain name system (DNS) resolver and receiving the IP address and the second IP address, respectively, in response to the requests.

Receiving information from the server system that indicates that one or more additional domains are hosted by the server system and acceptable to the server system for connection sharing can include receiving a header that comprises a list of one or more domain names acceptable to the server system for connection sharing with the first domain. Communications between the client computing device and the server system can follow the hypertext transfer protocol (HTTP) and the connection can be a transmission control protocol (TCP) connection.

Initiating a connection between the client computing device and the server system can include initiating a secure connection. A certificate from the server system is received at the client computing device. The certificate specifies the first domain name and one or more additional domain names. Determining that the connection between the client computing device and the server system is available can include determining that the certificate specifies the second domain name. Communications between the client computing device and the server system can follow the hypertext transfer protocol secure (HTTPS) and the connection can be a TCP connection. The client computing device can be a proxy server system.

In general, in another aspect, a computer-implemented method for re-using a connection between a client-computing device and a server system can include receiving at a client computing device a first domain name corresponding to a first domain and a request for content from the first domain. An Internet Protocol (IP) address for a server system that hosts the first domain can be determined. That a previously established connection between the client computing device and the server system is available can be determined. The connection was previously established to request content from the server system for a second domain also hosted by the server system and different than the first domain. The request for content can be sent to the server system over the established connection. Other embodiments of this aspect include corresponding systems, apparatus, and computer programs recorded on computer storage devices, each configured to perform the actions of the methods.

In general, in another aspect, a computer-implemented method for re-using a secure connection between a client computing device and a server system is described, and can include receiving at a client computing device a first domain name corresponding to a first domain and a request for first content from the first domain. An Internet Protocol (IP) address for a server system that hosts the first domain is determined. A secure connection between the client computing device and the server system is initiated, including receiving at the client computing device a certificate from the server system. The certificate specifies the first domain name and one or more additional domain names. A request is sent to the server system, in response to formation of the secure connection, for the first content over the secure connection. Information is received from the server system indicating one or more additional domain names hosted by the server system and acceptable to the server system for connection sharing. A second domain name corresponding to a second domain and a request for second content from the second domain is receiving at the client computing device. Whether the formed secure connection can be used to send the request for second content to the server system is determined, which includes determining: if the certificate specifies the second domain name; if the information from the server system specifies that the second domain is hosted by the server system and acceptable to the server system for connection sharing; and that the formed secure connection is available. Based on whether the formed secure connection can be used, the request for second content is sent to the server system over the connection. Other embodiments of this aspect include corresponding systems, apparatus, and computer programs recorded on computer storage devices, each configured to perform the actions of the methods.

These and other embodiments can each optionally include the following feature. Communications between the client computing device and the server system can follow the hypertext transfer protocol secure (HTTPS) and the formed secure connection can be a TCP connection.

In general, in another aspect, a method for re-using a connection between a client computing device and a server system is described including receiving at a server system a request from a client computing device to initiate a connection between the client computing device and the server system. After a connection is formed between the client computing device and the server system, a request from the client computing device for first content from a first domain hosted by the server system is received over the connection. Information is sent to the client computing device over the connection that specifies one or more additional domains hosted by the server system and acceptable to the server system for connection sharing. A request for second content from a second domain that is hosted by the server system and that was specified in the information sent from the server system to the client computing device is received over the connection, from the client computing device. The second content is sent to the client computing device over the connection in response to receiving the request for second content. Other embodiments of this aspect include corresponding systems, apparatus, and computer programs recorded on computer storage devices, each configured to perform the actions of the methods.

These and other embodiments can each optionally include one or more of the following features, alone or in combination. The client computing device can be a proxy server system. Communications between the client computing device and the server system can follow the hypertext transfer protocol (HTTP) and the connection can be a transmission control protocol (TCP) connection. Information sent to the client computing device specifying one or more additional domain names can include a header that includes a list specifying the one or more additional domain names. The server system can be a virtual host server system, and requests from the client computing device for content from the first domain and from the second domain can be sent from the virtual host server system to a back-end server system. The request to initiate a connection can be a request to initiate a secure connection. A certificate can be sent to the client. The certificate can indicate the first domain name and one or more additional domain names including the second domain name. Communications between the client computing device and the server system can follow the hypertext transfer protocol secure (HTTPS) and the connection can be a transmission control protocol (TCP) connection.

The systems and techniques described herein can include one or more of the following advantages. The overall RTT between a client computing device and a server system can be reduced, thereby improving the latency associated with communications between the client computing device and the server system. In one example, a user of a browser application executing on the client computing device to browse the Web can enjoy an improved user experience. Existing and idle connections between the client computing device and the server system can be shared when communicating with the server system in regards to multiple domains hosted by the server system. The number of requests to a domain name system (DNS) resolver to resolve domain names can be reduced, further improving latency times. Server computing resources can be spared by reducing the number of connections required between the server and other computing devices. The savings in computing resources can be particularly important for SSL connections, which can be expensive in terms of CPU resources to establish. A website developer can partition a website into multiple domain names, e.g., for security reasons (e.g., to prevent Javascript communication between partitions), without incurring the "cost" of additional connections between the server hosting the multiple domain names and a client computing device.

The details of one or more embodiments are set forth in the accompanying drawings and the description below. Other features and advantages will be apparent from the description and drawings, and from the claims.

DESCRIPTION OF DRAWINGS

FIG. 2 is a block diagram of an example system for reducing latency in network communications.

Like reference symbols in the various drawings indicate like elements.

DETAILED DESCRIPTION

Figure 1A:
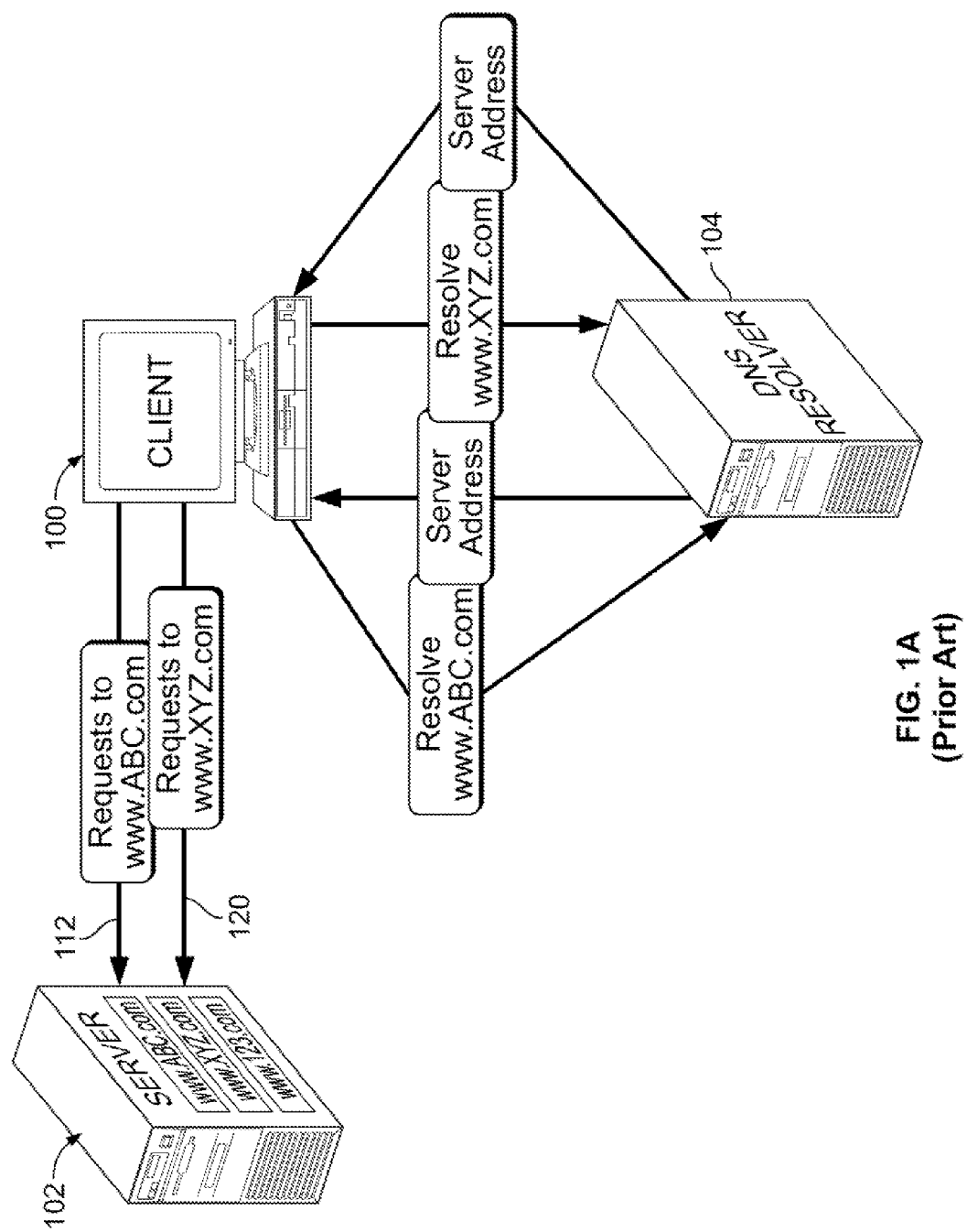
FIG. 1A is a schematic diagram of a prior art system for communicating between a server system and a client computing device.

FIG. 1A shows a prior art system and technique for a client computing device 100 to logically connect to a server system 102 to retrieve content relating to domains hosted by the server system 102. In this example, the server system 102 hosts multiple domains having the following domain names: www.ABC.com; www.XYZ.com; and www.123.com. In this prior art system, the client computing device 100 first logically connects to a DNS resolver 104 to obtain an Internet Protocol (IP) address corresponding to the domain name www.ABC.com, and receives the IP address from the DNS resolver 104. This transaction requires a first logical connection, for example, a TCP connection (TCP1). Next, the client computing device 100 initiates a logical connection to a server system, i.e., server system 102, at the IP address for www.ABC.com, thereby requiring a second TCP connection (TCP2) 112. The client computing device 100 communicates with the server system 102 over the TCP2 connection, for example, to request and receive content from the www.AB- C.com website. If the client computing device 100 then wants to retrieve content from the website at www.XYZ.com, the client computing device 100 initiates another TCP connection to the DNS resolver 104 (TCP3) and obtains the IP address corresponding to the www.XYZ.com domain name. In this example, the server system 102 also hosts the domain corresponding to www.XYZ.com. The client computing device then initiates another TCP connection to the server system 102 (i.e., TCP4) 120 to request and receive content from www.XYZ.com. Each time a connection is established between the client computing device and a server system there is a round-trip time (RTT) associated with the transaction.

Figure 1B:
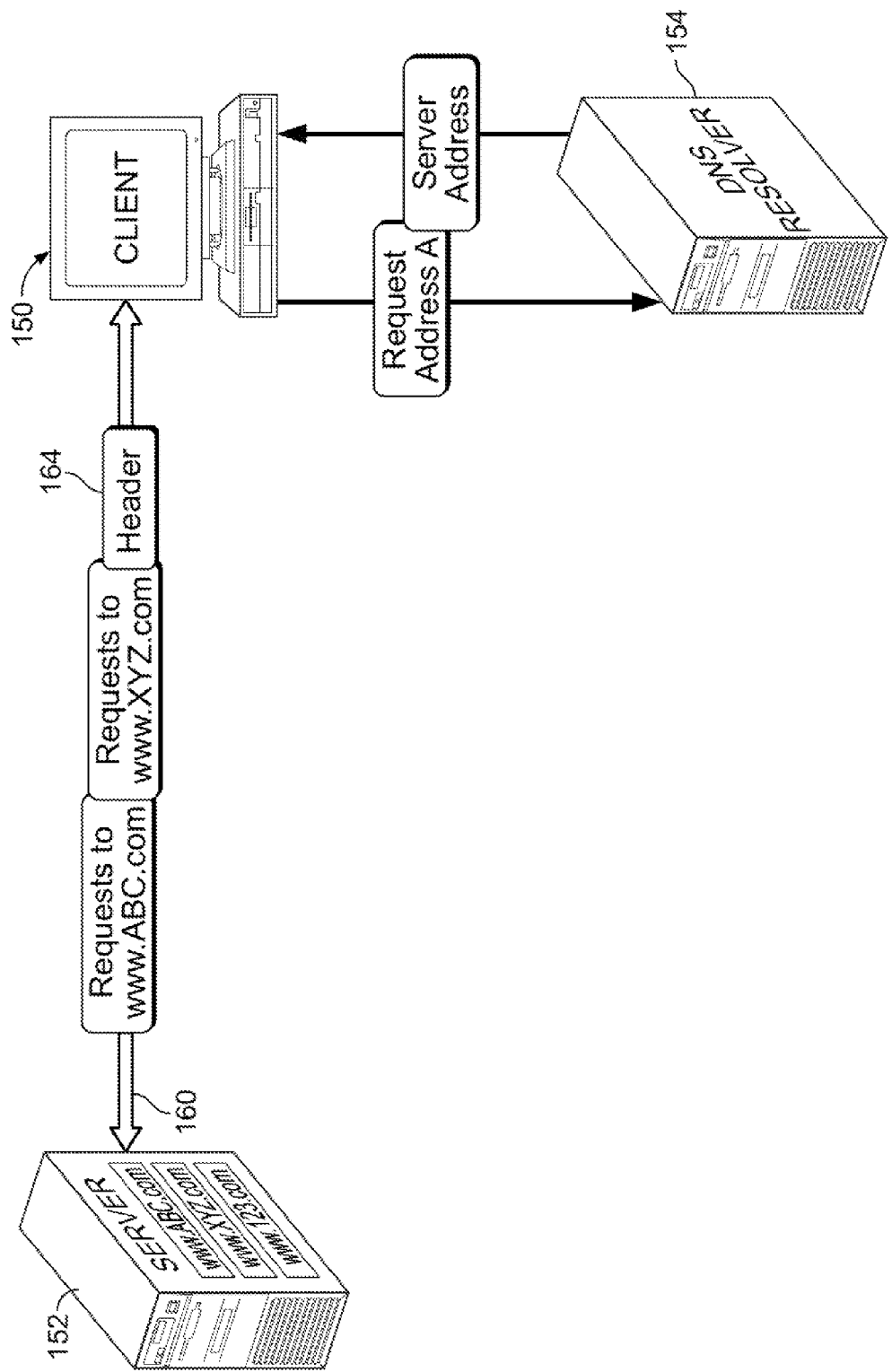
FIG. 1B is a schematic diagram of a system for communicating between a server system and client computing device with reduced latency over the system in FIG. 1A.

Reducing the number of connections can reduce the RTT associated with a transaction between the client computing device and a server system, and thereby improve latency. FIG. 1B is a schematic diagram of a system showing logical connections between a client computing device 150 and server system 152 and DNS resolver 154 that has reduced latency. The client computing device 150 re-uses an established connection 160 between the client computing device 150 and the server system 152 to obtain content from the server system 152 for more than one domain hosted by the server system 152, rather than requiring a new, separate connection to obtain content for each domain.

In the example shown, the client computing device 150 first seeks to retrieve content from a first domain having a first domain name, i.e., www.ABC.com. The client computing device 150 initiates a first connection (TCP1) with the DNS resolver 154 to request an IP address corresponding to the domain name www.ABC.com and receives the IP address from the DNS resolver 154. Next, the client computing device 150 initiates a logical connection 160 with the server system 152 at the IP address (TCP2). The client computing device 150 then communicates with the server system 152 over the connection 160 to request and receive content from www.ABC.com.

At a later time, the client computing device 150 seeks to retrieve content from a domain (e.g., a website) having the domain name www.XYZ.com. The domain corresponding to www.XYZ.com is hosted by the same server system as the domain corresponding to www.ABC.com, i.e., server system 152. The client computing device 150 therefore determines whether the connection 160 is idle and if so, sends a request for content from www.XYZ.com to the server system 152 over the previously formed connection, rather than forming a new connection which would require an additional RTT that can be avoided.

In the implementation shown, the client computing device 152 was able to determine that the domain name www.XYZ.com was hosted by the server system 152 because of information received from the server system 152. In some implementations, when the server system 152 first communicates with a client computing device, the server system sends information to the client computing device 150 specifying the domains hosted by the server system 152 that are acceptable to the server system 152 for connection sharing (which may be a sub-set of all of the domains hosted by the server system). In this example, the information can be implemented as a header field. The server system 152 sends a header 164 to the client computing device 150 that includes a list of domain names corresponding to domains hosted by the server system that are acceptable to the server system 152 for connection sharing with the domain corresponding to www.ABC.com. The server system can send the header 164 when first communicating with the client computing device 150 and the client computing device 150 can store the information. Then later, when the client computing device 150 seeks information from www.XYZ.com, the client computing device 150 can check to see whether the domain name is included in the list received from server system 152. If so, then the client computing device 150 can check whether there is an established connection to server system 152 that is idle and if so, then send a request to the server system 152 regarding www.XYZ.com over the connection.

The client computing device 150 does not have to resolve the domain name www.XYZ.com to an IP address, and can thereby avoid the RTT associated with a request to the DNS resolver. However, in some implementations, preferably the client computing device 150 does resolve the domain name www.XYZ.com to obtain the IP address for the corresponding server system. This action can be taken as a way to verify that the server system 152 is the host of the domain corresponding to www.XYZ.com, rather than relying on the information provided by the server system 152. A malicious server system may send out information to client computing devices that includes domain names that the server system does not actually host. Obtaining the IP address for the second domain name (i.e., www.XYZ.com) from an independent source, i.e., from the DNS resolver 154, can thwart the malicious server system.

In other implementations, the client computing device 150 can determine that the server system 152 hosts the www.XYZ.com domain name by resolving the domain name to an IP address and determining that a connection is already open and available, i.e., connection 160, to the server system 152, without receiving explicit information, i.e., the header 164, from the server system 152. The client computing device 150 can proceed to use the connection 160 to communicate with the server system 152 about both the www.ABC.com and www.XYZ.com domains. Preferably, however, the client computing device 150 only re-uses an established connection after receiving information from the server system 152 indicating that connection sharing is acceptable for the particular domain, to avoid problems, for example, load-balancers incorrectly forwarding requests from the client computing device 150.

A domain name can be an alias of another domain name referred to as a canonical domain name or a CNAME. For example, when a server system hosts both foo.example.com and bar.example.com, the domain name corresponding to the IP address for the server system may be bar.example.com. In this example, bar.example.com is the canonical or CNAME for the alias foo.example.com. The DNS resolver can encounter a CNAME record while looking for the IP address for foo.example.com. The DNS resolver can then restart the query using the canonical name to find the IP address for bar.example.com. The IP address is then returned to the client computing device as the IP address for foo.example.com. In some implementations, the client computing device can obtain a listing of all the domain names that are alias for a particular CNAME, and which therefore all resolve to the same IP address. The client computing device can later use this information to determine whether a second domain name (e.g, foo.example.com) has a same IP address as a first domain name (e.g., bar.example.com), and if so, share an available connection between the client computing device and a server system at the IP address, thereby avoiding having to resolve the second domain name. That is, the client computing device can avoid connecting to the DNS resolver a second time and making a request for the IP address for the second domain name (e.g., foo.example.com), thereby reducing latency.

Referring now to FIG. 2, a schematic representation of an example system 200 that can be used to implement the latency reduction process described herein is shown. The system 200 includes a client computing device 202 that includes a RAM (random access memory) 208, user interface 210 and CPU (central processing unit) 212 and a disc 214. The disc 214 stores code for an operating system 216 and applications, for example, a browser application 218. The browser application 218 includes a connections manager 212 that includes a secure connections table 214.

The client computing device 202 is shown connected to a server system 104. In this example, the server system 204 hosts three domain names: www.ABC.com 222, www.XYZ.com 224 and www.123.com 226. A logical connection 230 is shown between the client computing device 202 and the server system 204. In some examples, the client computing device 202 and the server system 104 communicate following the hypertext transfer protocol (HTTP) and the connection 230 is according to the transmission control protocol (TCP). However, it should be understood that the client computing device 202 and server system 104 can communicate according to a different protocol and the connection can be according to a different protocol. For example, the connection can follow the user datagram protocol (UDP) or the stream control transmission protocol (SCTP). The client computing device 202 in this example is a computer configured to receive input from a user, e.g., at user interface 218. However, in other examples, the client computing device 202 is a proxy server system that receives requests for content from one or more computers and behaves as an intermediary between the computers and one or more server systems. The systems and techniques described herein can be implemented in such a client, i.e., a proxy server system.

The connections manager 212 can be configured to determine if there is a previously established connection between the client computing device 202 and the server system 204 that can be re-used to avoid having to initiate a new connection. For example, in implementations where the server system 204 sends information (e.g., a header) to the client computing device 202 specifying one or more domain hosted by the server system 204 that are acceptable to the server system for connection sharing, the connections manager 212 can be configured to store and reference this information. When the browser application 210 resolves a domain name to an IP address, the connections manager 212 can be configured to determine whether a connection to the IP address is already established and available and if so, to search the information (e.g., header) received from the server system at the IP address to determine whether connection sharing is acceptable. If so, then the connections manager 212 can instruct the browser application 210 to connect to the server system 204 over the established connection.

In some implementations, a secure connection is desired between the client computing device 202 and the server system 204. For example, the client computing device 202 may request a secure connection from the server system 204 for communications relating to domain name www.ABC.com. The server system 204 and client computing device 202 can engage in a security handshake, e.g., according to the transport layer security (TLS) protocol or the secure sockets layer (SSL) protocol, which can include the server system 204 providing a certificate to the client computing device 202. The certificate may apply to a single domain name that is identified on the certificate, e.g., the common name specified in the subject field of a TLS certificate. However, in some implementations, a certificate applies to more than one domain name and can specify the one or more additional domain names, e.g., in the subject alternative field of a TLS certificate, or a wildcard common domain name. The connections manager 212 can maintain a secure connections table 214, being a table identifying already formed secure connections between the client computing device 202 and a server system and identifying the corresponding domain names specified on the certificates that were received when each secure connection was established.

By way of example, if the connection 230 is a secure connection that was established when the client computing device 202 connected to the server system 204 to make requests for content from the www.ABC.com domain name 222, then the certificate received from the server system 104 would have specified the www.ABC.com domain name, e.g., in the subject field of a TLS certificate. However, in this example, the certificate also named the www.XYZ.com domain name 224 and the www.123.com domain name 226 as other domain names to which the certificate applied. Later, the client computing device 202 seeks a secure connection with the server system 204 to send a request regarding the www.XYZ.com domain name. The secure connections table 214 is then referenced to determine that the certificate received from the server system 204 when the secure connection 230 was established also named the www.XYZ.com domain name. The secure connection, if idle, can therefore be re-used to send a request from the client computing device 202 to the server system 204 for content from the www.XYZ.com domain name. The time savings by re-using the established connection include the savings attributed to: (1) not resolving the www.XYZ.com domain name to an IP address; (2) not establishing a second connection to the server system 204; and (3) not performing a security handshake to establish the second (secure) connection to the server system 204.

In the example of a secure connection, resolving the second domain name (i.e., the www.XYZ.com domain name) can be avoided because the certificate presented by the server system 204 when establishing the connection 230 can provide the desired verification that the server system 204 is the actual host of the second domain name, i.e., not a malicious server system. Preferably, the server system 204 would have also sent information to the client computing device 202, e.g., a header, specifying the one or more domain names also hosted by the server system 204 and acceptable to the server system 204 for connection sharing. In such implementations, the client computing device 202 can determine from the information provided by the server system 204 that the server system 204 hosts the second domain, and can verify this information from the certificate provided by the server system 204 when the security handshake was performed with respect to communications regarding the first domain name (i.e., the www.ABC.com domain name).

Figure 3:
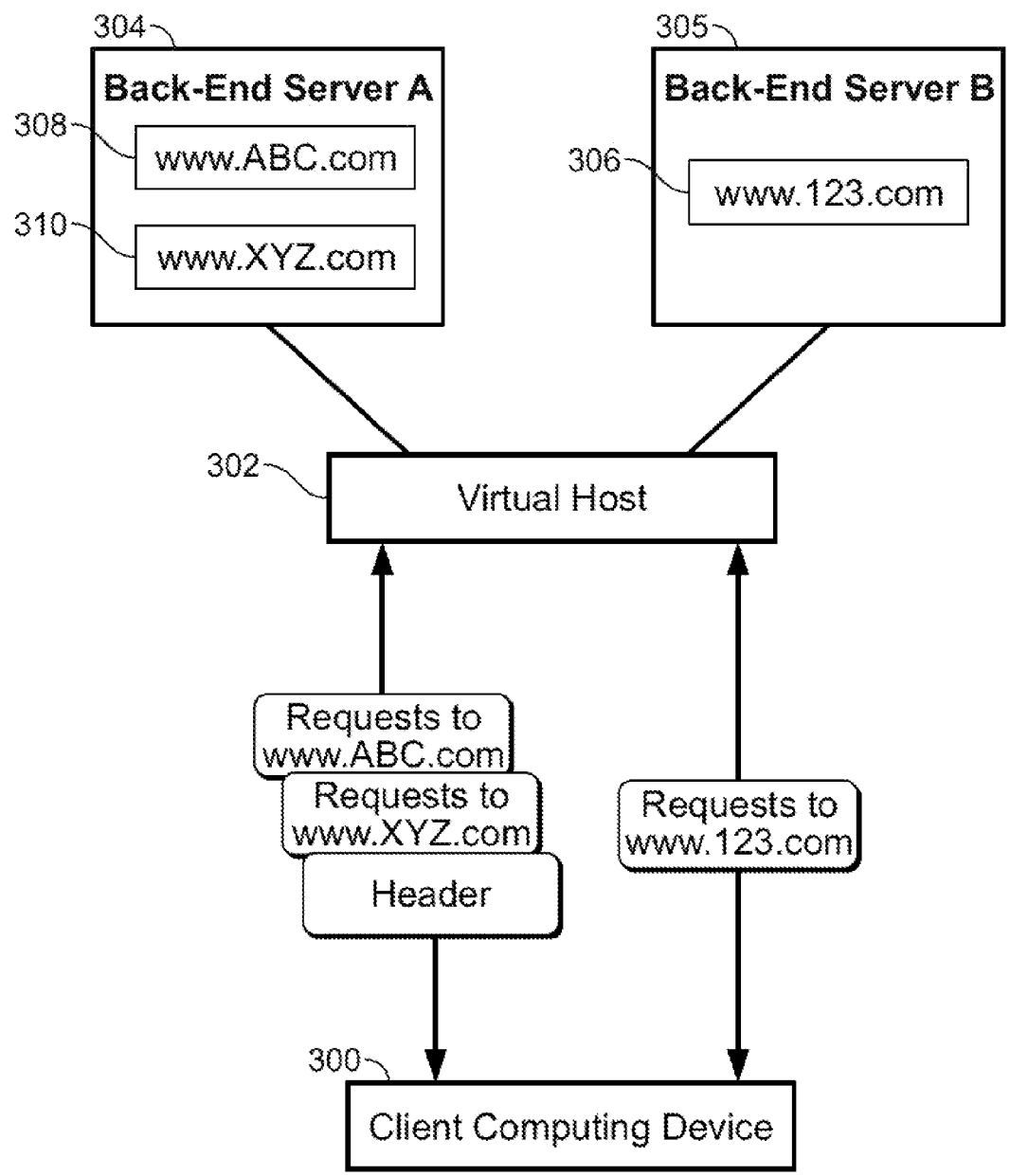
FIG. 3 is a block diagram of an example system including a virtual host.

FIG. 3 shows an schematic diagram of an example system including a virtual host server system 302 that redirects requests for hosted domain to one or more back-end server systems. In the example shown, the virtual host server system 302 is a virtual host to the three domain: www.ABC.com; www.XYZ.com and www.123.com. A first back-end server system, i.e., back-end server system A 304 is the actual host of content for the first two domain, i.e., for www.ABC.com 308 and www.XYZ.com 310. A second back-end server system, i.e., back-end server system B 305, is the actual host of content for the third domain name, i.e., for www.123.com 306.

In a system with a virtual host server system, shared connections can still be used to reduce latency for communications between the virtual host and one or more client computing devices. In some implementations, a connection between the virtual host 302 and the client computing device 300 can be re-used for communications between the client computing device 300 and the virtual host 302 relating to all the domains hosted by the virtual host 302, i.e., relating to www.ABC.com, www.XYZ.com and www.123.com.

In some implementations, preferably the connection between the client computing device 300 and the virtual host 302 is only re-used from domains that share a common back-end server system. When the virtual host 302 first communicates with the client computing device 300 to send requested content from the www.ABC.com domain, the virtual host 302 can send information (e.g., a header) to the client computing device 300 indicating the domains acceptable to the virtual host 302 for connection sharing with the domain at www.ABC.com, i.e., indicating the domain having the domain name www.XYZ.com. The information provided by the virtual host 302 would not name the third hosted domain, i.e., the domain name www.123.com, since the third domain is hosted by a different back-end server system, i.e., back-end server system B 306.

Figure 4:
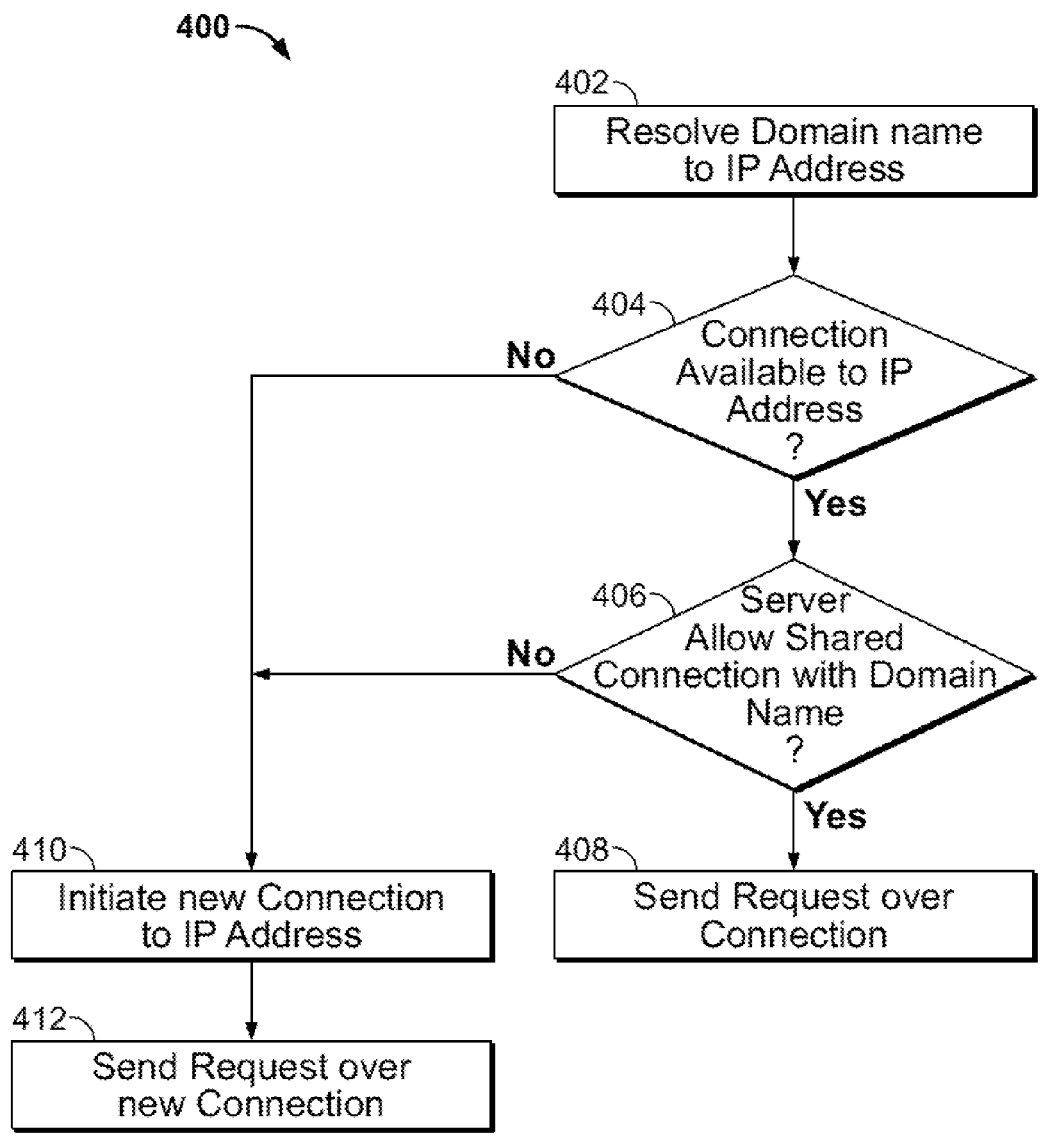
FIG. 4 is a flowchart showing an example process for communicating between a server system and a client computing device.

FIG. 4 is a flowchart showing an example process 400 for a client computing device to communicate with a server system with reduced latency. The client computing device seeks to obtain content for a domain corresponding to a domain name. The client computing device resolves an IP address for the domain name (Box 402). For example, the client computing device can make a request to a DNS resolver the IP address and in response receive the IP address. The client computing device can determine whether an idle connection is already available between the client computing device and a server system corresponding to the IP address (Box 404). If an idle connection is available ("yes" branch of box 404), then the client computing device can determine whether the server system allows shared connections for the particular domain. In some implementations, the server system would have previously provided information (e.g., as a header) to the client computing device when the idle connection was first established that indicated one or more domains hosted by the server system for which connection sharing was acceptable to the server system. The client computing device would have stored this information then referenced the information later to determine whether connection sharing for the particular domain was acceptable. If connection sharing is allowed ("yes" branch of box 406), then the client computing device sends the request for content from the domain over the connection to the server system (box 408).

If at box 404 there is no idle connection available to a server system at the IP address, then the client computing device can initiate a new connection to the IP address (box 410) and send the request for content over the new connection (box 412). Similarly, if the server system did not provide information to the client computing device indicating that connection sharing was acceptable to the server system for the particular domain ("no" branch of box 406), then the client computing device can initiate a new connection to the IP address (box 410) and send the request over the new connection (box 412).

The action at box 406 can be optional, but is preferred to avoid potential errors, e.g., caused by load-balancers or by the server system being a virtual host connecting to multiple back-end servers.

The information provided by a server system to a client computing device that indicates the one or more domains hosted by the server system for which connection sharing is acceptable can be provided in any convenient format. In some implementations, as discussed above, the information is provided in a header field. An example is shown below, where the header is implemented as an Accept-Hostnames header field:
    X-Accept-Hostnames: www.ABC.com, *.XYZ.com, -www.123.com If the above example header field becomes standardized, then the X prefix can be removed.

In the above example, the domains acceptable for connection sharing are domains having the name www.ABC.com and names ending in .XYZ.com, where "*" is a wildcard. That is, www.XYZ.com is accepted. However, sites.XYZ.com is also accepted, since the * is a wildcard. In this example, the "-" indicates excluded domains. That is, the domain having the domain name www.123.com is explicitly excluded from connection sharing by this server system. For example, referring to the virtual host system in FIG. 3, the virtual host server 302 may only accept connection sharing for domain sharing a back-end server, and therefore exclude the www.123.com domain from connection sharing with the other two domains, i.e., www.ABC.com and www.XYZ.com. The absence of the header can imply that the server system does not support connection sharing between domains.

Some websites have content on multiple domains hosted by a common server system, e.g., to enable content to be downloaded in parallel. For example, the website maps.example.com may have content on domains named mt0.example.com and mt1.example.com. If map tiles can be fetched from either mt0.example.com or mt1.example.com, then client computing device can initiate a connection to mt1.example.com if there is no idle connection available to either mt0.example and mt1.example.com.

Figure 5:
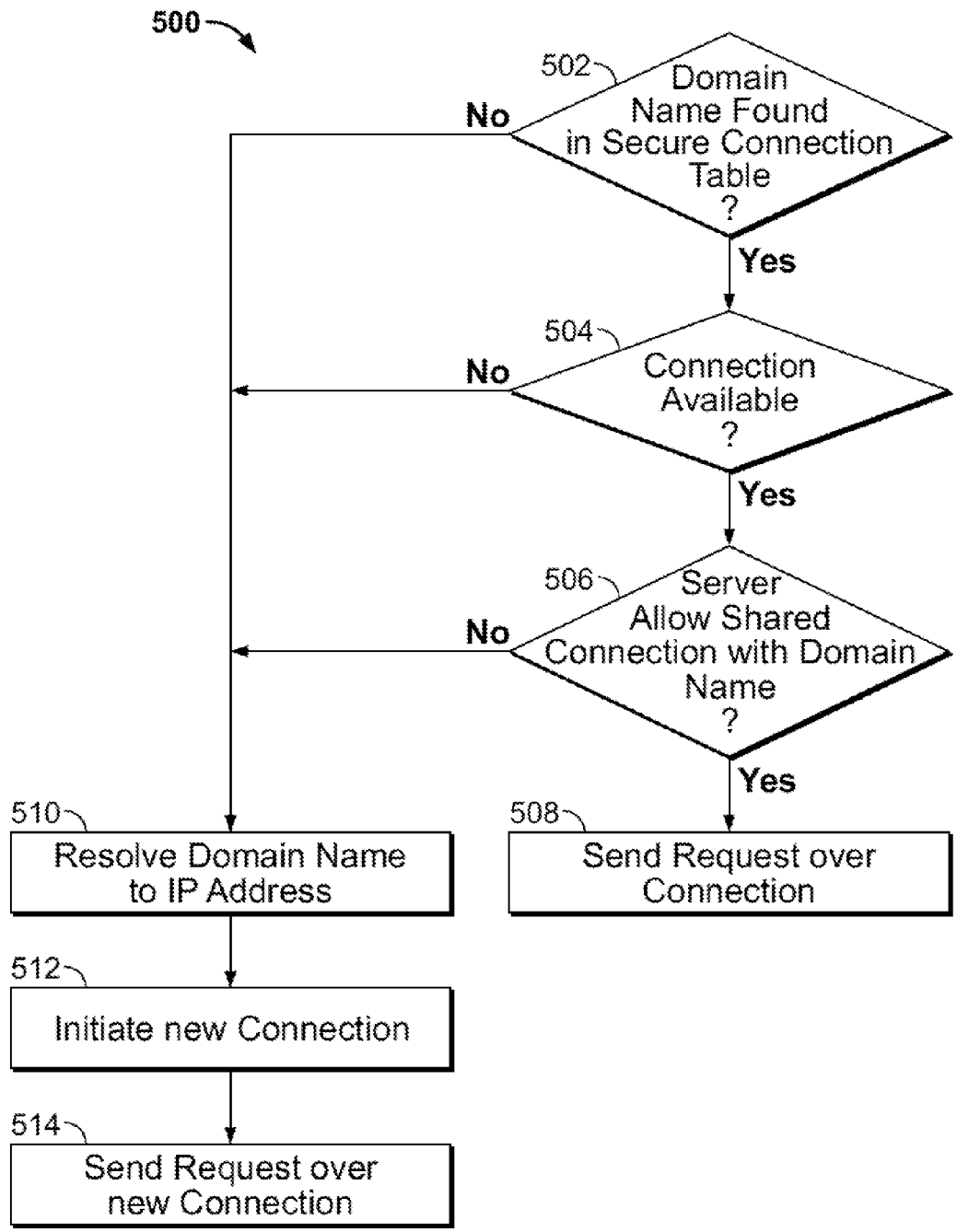
FIG. 5 is a flowchart showing an example process for securely communicating between a server system and a client computing device.

FIG. 5 is a flowchart showing an example process 500 for a client computing device to communicate with a server system over a secure connection with reduced latency. A client computing device seeks to obtain content from a domain having a domain name. The client computing device can determine whether domain name is included in a secure connections table (box 502). A secure connections table is a table that identifies secure connections open between the client computing device and one or more servers and, for each connection, the one or more domain names specified on the certificate received from the server when the secure connection was established. The information can be stored in a format other than a table, and a table is but one example.

If the domain name is included in the table ("yes" branch of box 502), then the client computing device can determine if the secure connection corresponding to the domain name in the table is idle (i.e., available) (box 504). If the secure connection is available ("yes" branch of box 504), then the client computing device can determine whether the server system corresponding to the secure connection allows a shared connection for the particular domain (box 506). For example, the server system may have sent information to the client computing device when the secure connection was first established that indicated one or more domains that the server system hosted and that were acceptable to the server system for connection sharing. If the particular domain is acceptable to the server system for connection sharing ("yes" branch of box 506), then the client computing device sends the request for content from the domain over the secure connection to the server system (box 508).

If the domain name is not found in the table ("no" branch of box 502), or if the connection is not available ("no" branch of box 504), or if the server system does not accept connection sharing for the particular domain ("no" branch of box 506), then the client computing device can resolve the IP address for the domain name (box 510), e.g., by making a request to a DNS resolver. The client computing device can then initiate a new secure connection to the server system at the IP address (box 512) and send the request for content over the new connection once established (box 514).

In some implementations, secure connections shared between multiple domains can be treated as though they are independent connections. For instance, a certificate verification error (e.g., certificate expiry) may occur when initially establishing the connection between a client computing device and a server system with respect to a first domain. The client's agreement to continue through a warning dialog can be held to apply only to the first domain for which the client has been warned. If the underlying certificate is subsequently reused to communicate with a second domain (where the domain name of the second domain is also specified in the certificate) over the same secure connection, the user can be warned again of the certificate validation error.

In the discussions above, an idle connection can refer to a connection that has no response pending. However, in instances when pipelining is enabled, a connection can be considered idle even when a response is pending.

In the examples discussed above, a domain name resolved to an IP address. However, it should be understood, that a domain name can resolve to two or more IP addresses. For example, the server system hosting the domain corresponding to the domain name can include multiple servers at one or more physical locations having one or more IP addresses. In such instances, determining whether an idle connection is already available between the client computing device and the server system hosting the domain can include determining whether an idle connection is available to any one of the multiple IP addresses returned by the DNS resolver.

The techniques described above for providing information from a server system to a client computing device (e.g., by way of a header) to allow for connection sharing can also be used to improve latency in subsequent communications between the server system and client computing device, even without connection sharing. That is, the information received by the client computing device indicating the domains hosted by the server system can be used by the client computing device when later initiating a connection to the server system for any of the domains indicated.

For example, if a client computing device initiates a connection to a server system that hosts a first domain, e.g., foo.example.com, to request content relating from the first domain, a protocol negotiation can occur. For example, during an initial handshake between the client computing device and the server system, the HTTP protocol can be upgraded to the Web Socket protocol over the same underlying TCP/IP connection. Web Socket data frames then can be sent back and forth between the client computing device and the server system in full-duplex mode. Once the client computing device has learned that the server system supports the Web Socket protocol, then the next time the client computing device connects to the server system to request content from any domain the server system hosts, the client computing device can avoid the protocol negotiation and initiate the connection following the Web Socket protocol.

That is, the server system can provide information to the client computing device when initially communicating with the client computing device in regards to a first domain, which information indicates the additional domains hosted by the server system. The client computing device can store this information, for example, to re-use an existing connection between the client computing device and the server system for a second domain. However, the client computing device can also reference this information later to avoid a second protocol negotiation. If, at a later time, the client computing device is initiating a connection to the server system, this time in regards to a second domain, the client computing system can refer to the stored information to determine that the server system is the same server system previously determined to use Web Socket protocol, and initiate the connection accordingly. The protocol negotiation, and therefore the associated latency, can be avoided.

Protocol negotiation is but one example of server system capabilities that can be negotiated with the client computing device on a server-basis rather than on a domain name-basis, thereby avoiding negotiating the capability repeatedly when communicating with the same server system with respect to multiple domains hosted by the server system. In another example, the server system can include an Accept-Ranges response-header field in a communication to the client computing device to indicate the server system's acceptance of range requests for a resource. If the client computing device is also provided with information indicating the domains hosted by the server system (e.g., by an Accept-Hostnames header), then the client computing system can use the Accept-Ranges header information when communicating with this same server system to request content from a second domain, rather than having to "relearn" the information on a domain-by-domain basis.

Figure 6:
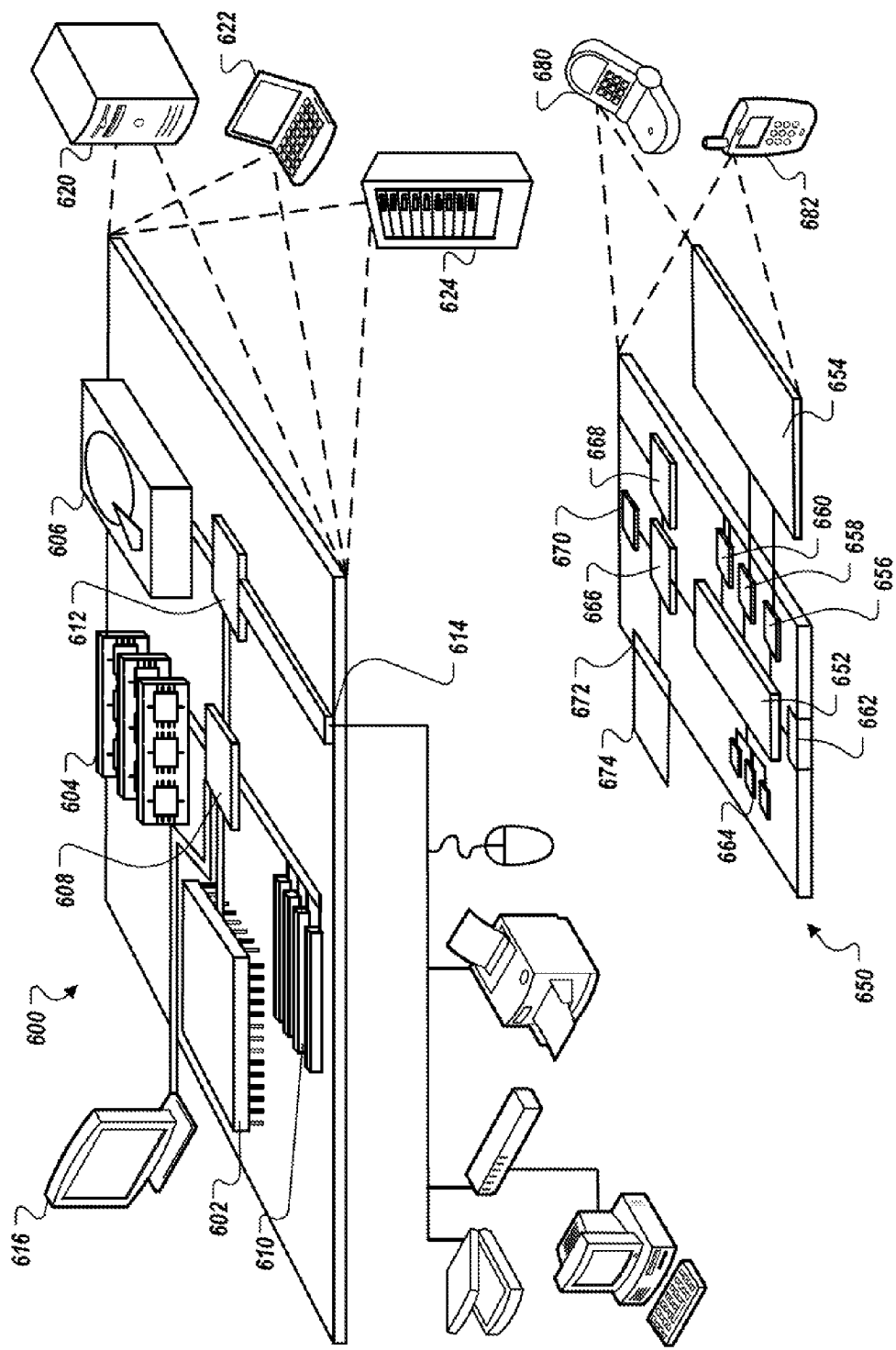
FIG. 6 shows examples of generic computer devices that may be used to execute the actions discussed in this document.

FIG. 6 shows an example of a generic computer device 600 and a generic mobile computer device 650, which can be used with the techniques described herein. Computing device 600 is intended to represent various forms of digital computers, such as laptops, desktops, workstations, personal digital assistants, servers, server systems, blade servers, mainframes, and other appropriate computers. Computing device 650 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the subject matter described and/or claimed in this document.

Computing device 600 includes a processor 602, memory 604, a storage device 606, a high-speed interface 608 connecting to memory 604 and high-speed expansion ports 610, and a low speed interface 612 connecting to low speed bus 614 and storage device 606. Each of the components 602, 604, 606, 608, 610, and 612, are interconnected using various buses, and can be mounted on a common motherboard or in other manners as appropriate. The processor 602 can process instructions for execution within the computing device 600, including instructions stored in the memory 604 or on the storage device 606 to display graphical information for a GUI on an external input/output device, such as display 616 coupled to high speed interface 608. In other implementations, multiple processors and/or multiple buses can be used, as appropriate, along with multiple memories and types of memory. Also, multiple computing devices 600 can be connected, with each device providing portions of the necessary operations (e.g., as a server bank, a group of blade servers, or a multi-processor system).

The memory 604 stores information within the computing device 600. In one implementation, the memory 604 is a volatile memory unit or units. In another implementation, the memory 604 is a non-volatile memory unit or units. The memory 604 can also be another form of computer-readable medium, such as a magnetic or optical disk.

The storage device 606 is capable of providing mass storage for the computing device 600. In some implementations, the storage device 606 can be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product can also include instructions that, when executed, perform one or more methods, such as those described above. The information carrier can be a computer-readable or machine-readable medium, such as the memory 604, the storage device 606, memory on processor 602, or a propagated signal.

The high speed controller 608 manages bandwidth-intensive operations for the computing device 600, while the low speed controller 612 manages lower bandwidth-intensive operations. Such allocation of functions is exemplary only. In one implementation, the high-speed controller 608 is coupled to memory 604, display 616 (e.g., through a graphics processor or accelerator), and to high-speed expansion ports 610, which can accept various expansion cards (not shown). In the implementation, low-speed controller 612 is coupled to storage device 606 and low-speed expansion port 614. The low-speed expansion port, which can include various communication ports (e.g., USB, Bluetooth, Ethernet, wireless Ethernet) can be coupled to one or more input/output devices, such as a keyboard, a pointing device, a scanner, or a networking device such as a switch or router, e.g., through a network adapter.

The computing device 600 can be implemented in a number of different forms, as shown in the figure. For example, it can be implemented as a standard server 620, or multiple times in a group of such servers. It can also be implemented as part of a rack server system 624. In addition, it can be implemented in a personal computer such as a laptop computer 622. Alternatively, components from computing device 600 can be combined with other components in a mobile device (not shown), such as device 650. Each of such devices can include one or more of computing device 600, 650, and an entire system can be made up of multiple computing devices 600, 650 communicating with each other.

Computing device 650 includes a processor 652, memory 664, an input/output device, such as a display 654, a communication interface 666, and a transceiver 668, among other components. The device 650 can also be provided with a storage device, such as a microdrive or other device, to provide additional storage. Each of the components 650, 652, 664, 654, 666, and 668, are interconnected using various buses, and several of the components can be mounted on a common motherboard or in other manners as appropriate.

The processor 652 can execute instructions within the computing device 650, including instructions stored in the memory 664. The processor can be implemented as a chipset of chips that include separate and multiple analog and digital processors. The processor can provide, for example, for coordination of the other components of the device 650, such as control of user interfaces, applications run by device 650, and wireless communication by device 650.

Processor 652 can communicate with a user through control interface 658 and display interface 656 coupled to a display 654. The display 654 can be, for example, a TFT LCD (Thin-Film-Transistor Liquid Crystal Display) or an OLED (Organic Light Emitting Diode) display, or other appropriate display technology. The display interface 656 can comprise appropriate circuitry for driving the display 654 to present graphical and other information to a user. The control interface 658 can receive commands from a user and convert them for submission to the processor 652. In addition, an external interface 662 can be provide in communication with processor 652, so as to enable near area communication of device 650 with other devices. External interface 662 can provide, for example, for wired communication in some implementations, or for wireless communication in other implementations, and multiple interfaces can also be used.

The memory 664 stores information within the computing device 650. The memory 664 can be implemented as one or more of a computer-readable medium or media, a volatile memory unit or units, or a non-volatile memory unit or units. Expansion memory 674 can also be provided and connected to device 650 through expansion interface 672, which can include, for instance, a SIMM (Single In Line Memory Module) card interface. Such expansion memory 674 can provide extra storage space for device 650, or can also store applications or other information for device 650. Specifically, expansion memory 674 can include instructions to carry out or supplement the processes described above, and can include secure information also. Thus, for example, expansion memory 674 can be provided as a security module for device 650, and can be programmed with instructions that permit secure use of device 650. In addition, secure applications can be provided via the SIMM cards, along with additional information, such as placing identifying information on the SIMM card in a non-hackable manner.

The memory can include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer-readable or machine-readable medium, such as the memory 664, expansion memory 674, memory on processor 652, or a propagated signal that can be received, for example, over transceiver 668 or external interface 662.

Device 650 can communicate wirelessly through communication interface 666, which can include digital signal processing circuitry where necessary. Communication interface 666 can provide for communications under various modes or protocols, such as GSM voice calls, SMS, EMS, or MMS messaging, CDMA, TDMA, PDC, WCDMA, CDMA2000, or GPRS, among others. Such communication can occur, for example, through radio-frequency transceiver 668. In addition, short-range communication can occur, such as using a Bluetooth, WiFi, or other such transceiver (not shown). In addition, GPS (Global Positioning System) receiver module 670 can provide additional navigation-related and location-related wireless data to device 650, which can be used as appropriate by applications running on device 650.

Device 650 can also communicate audibly using audio codec 660, which can receive spoken information from a user and convert it to usable digital information. Audio codec 660 can likewise generate audible sound for a user, such as through a speaker, e.g., in a handset of device 650. Such sound can include sound from voice telephone calls, can include recorded sound (e.g., voice messages, music files, etc.) and can also include sound generated by applications operating on device 650.

The computing device 650 can be implemented in a number of different forms, as shown in the figure. For example, it can be implemented as a cellular telephone 680. It can also be implemented as part of a smartphone 682, personal digital assistant, or other similar mobile device.

Device 650 can also include one or more different devices that are capable of sensing motion. Examples include, but are not limited to, accelerometers and compasses. Accelerometers and compasses, or other devices that are capable of detecting motion or position are available from any number of vendors and can sense motion in a variety of ways. For example, accelerometers can detect changes in acceleration while compasses can detect changes in orientation respective to the magnetic North or South Pole. These changes in motion can be detected by the device 650 and used to update the display of the respective devices 650 according to processes and techniques described herein.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include client computing devices and servers. A client computing device and server are generally remote from each other and typically interact through a communication network. The relationship of client computing device and server arises by virtue of computer programs running on the respective computers and having a client-server relationship to each other.

A number of embodiments have been described. Nevertheless, it will be understood that various modifications can be made without departing from the spirit and scope of the invention.

In addition, the logic flows depicted in the figures do not require the particular order shown, or sequential order, to achieve desirable results. In addition, other steps can be provided, or steps can be eliminated, from the described flows, and other components can be added to, or removed from, the described systems. Accordingly, other embodiments are within the scope of the following claims.

What is claimed is:

1. A computer-implemented method for re-using a connection between a client computing device and a server system, comprising:
    receiving at a server system a request from a client computing device to initiate a connection between the client computing device and the server system;
    after the connection is formed between the client computing device and the server system, receiving at the server system over the connection, a request from the client computing device for first content from a first domain hosted by the server system;
    sending information from the server system to the client computing device over the connection that specifies one or more additional domains hosted by the server system and acceptable to the server system for connection sharing;
    receiving at the server system over the connection, from the client computing device, a request for second content from a second domain that is hosted by the server system and that was specified in the information sent from the server system to the client computing device; and
    sending the second content to the client computing device over the connection in response to receiving the request for second content.

2. The method of claim 1, wherein the client computing device is a proxy server system.

3. The method of claim 1, wherein communications between the client computing device and the server system follow the hypertext transfer protocol (HTTP) and the connection comprises a transmission control protocol (TCP) connection.

4. The method of claim 1, wherein sending information to the client computing device specifying one or more additional domain names comprises sending a header that comprises a list specifying the one or more additional domain names.

5. The method of claim 1, wherein the server system comprises a virtual host server system and requests from the client computing device for content from the first domain and from the second domain are sent from the virtual host server system to a back-end server system.

6. The method of claim 1, wherein the request to initiate a connection is a request to initiate a secure connection, the method further comprising:
    sending a certificate to the client, which certificate indicates the first domain name and one or more additional domain names including the second domain name.

7. The method of claim 6, wherein communications between the client computing device and the server system follow the hypertext transfer protocol secure (HTTPS) and the connection comprises a transmission control protocol (TCP) connection.

8. A non-transitory computer-readable medium having instructions encoded thereon, which, when executed by a processor, cause the processor to perform operations comprising:

receiving at a server system a request from a client computing device to initiate a connection between the client computing device and the server system;

after the connection is formed between the client computing device and the server system, receiving at the server system over the connection, a request from the client computing device for first content from a first domain hosted by the server system;

sending information from the server system to the client computing device over the connection that specifies one or more additional domains hosted by the server system and acceptable to the server system for connection sharing;

receiving at the server system over the connection, from the client computing device, a request for second content from a second domain that is hosted by the server system and that was specified in the information sent from the server system to the client computing device; and sending the second content to the client computing device over the connection in response to receiving the request for second content.

9. The non-transitory computer-readable medium of claim 8, wherein the client computing device is a proxy server system.

10. The non-transitory computer-readable medium of claim 8, wherein communications between the client computing device and the server system follow the hypertext transfer protocol (HTTP) and the connection comprises a transmission control protocol (TCP) connection.

11. The non-transitory computer-readable medium of claim 8, wherein sending information to the client computing device specifying one or more additional domain names comprises sending a header that comprises a list specifying the one or more additional domain names.

12. The non-transitory computer-readable medium of claim 8, wherein the server system comprises a virtual host server system and requests from the client computing device for content from the first domain and from the second domain are sent from the virtual host server system to a back-end server system.

13. The non-transitory computer-readable medium of claim 8, wherein the request to initiate a connection is a request to initiate a secure connection, further including instructions to cause the processor to perform operations comprising:

sending a certificate to the client, which certificate indicates the first domain name and one or more additional domain names including the second domain name.

14. The non-transitory computer-readable medium of claim 13, wherein communications between the client computing device and the server system follow the hypertext transfer protocol secure (HTTPS) and the connection comprises a transmission control protocol (TCP) connection.

15. A system comprising:
a processor;
a storage device coupled to the processor and configurable for storing instructions, which, when executed by the processor cause the processor to perform operations comprising:

receiving at a server system a request from a client computing device to initiate a connection between the client computing device and the server system;

after the connection is formed between the client computing device and the server system, receiving at the server system over the connection, a request from the client computing device for first content from a first domain hosted by the server system;

sending information from the server system to the client computing device over the connection that specifies one or more additional domains hosted by the server system and acceptable to the server system for connection sharing;

receiving at the server system over the connection, from the client computing device, a request for second content from a second domain that is hosted by the server system and that was specified in the information sent from the server system to the client computing device; and sending the second content to the client computing device over the connection in response to receiving the request for second content.

16. The system of claim 15, wherein the client computing device is a proxy server system.

17. The system of claim 15, wherein communications between the client computing device and the server system follow the hypertext transfer protocol (HTTP) and the connection comprises a transmission control protocol (TCP) connection.

18. The system of claim 15, wherein sending information to the client computing device specifying one or more additional domain names comprises sending a header that comprises a list specifying the one or more additional domain names.

19. The system of claim 15, wherein the server system comprises a virtual host server system and requests from the client computing device for content from the first domain and from the second domain are sent from the virtual host server system to a back-end server system.

20. The system of claim 15, wherein the request to initiate a connection is a request to initiate a secure connection, the instructions, which, when executed by the processor cause the processor to perform operations further comprising:

sending a certificate to the client, which certificate indicates the first domain name and one or more additional domain names including the second domain name.

* * * * *